(12) United States Patent
Freiborg

(10) Patent No.: US 10,174,504 B1
(45) Date of Patent: Jan. 8, 2019

(54) LAMINATED ROOF SHINGLE

(71) Applicant: Mark Freiborg, Long Beach, CA (US)

(72) Inventor: Mark Freiborg, Long Beach, CA (US)

(*) Notice: Subject to any disclaimer, the term of this patent is extended or adjusted under 35 U.S.C. 154(b) by 0 days.

(21) Appl. No.: 15/925,238

(22) Filed: Mar. 19, 2018

(51) Int. Cl.
*E04D 1/26* (2006.01)
*E04D 1/20* (2006.01)
*B32B 3/26* (2006.01)
*B32B 9/04* (2006.01)
*B32B 5/16* (2006.01)
*E04D 1/00* (2006.01)

(52) U.S. Cl.
CPC .............. *E04D 1/26* (2013.01); *B32B 3/26* (2013.01); *B32B 5/16* (2013.01); *B32B 9/04* (2013.01); *E04D 1/20* (2013.01); *B32B 2419/06* (2013.01); *E04D 2001/005* (2013.01)

(58) Field of Classification Search
CPC .... B32B 3/26; B32B 5/16; B32B 9/04; B32B 2419/06; E04B 1/20; E04B 1/26; E04B 2001/005
See application file for complete search history.

(56) References Cited

U.S. PATENT DOCUMENTS

| | | | | |
|---|---|---|---|---|
| 3,613,328 A * | 10/1971 | Morgan, Jr. et al. | ..... | E04D 1/26 52/555 |
| 3,624,975 A * | 12/1971 | Morgan et al. | ........... | E04D 1/26 52/105 |
| 3,625,975 A | 12/1971 | Morgan et al. | | |
| 4,233,100 A * | 11/1980 | Cunningham | ......... | B23D 19/06 156/260 |
| 4,274,243 A * | 6/1981 | Corbin | ...................... | D06N 5/00 156/264 |
| 4,333,279 A * | 6/1982 | Corbin | ...................... | E04D 1/26 52/105 |
| 4,527,374 A * | 7/1985 | Corbin | ...................... | E04D 1/26 52/557 |
| 4,717,614 A * | 1/1988 | Bondoc | ..................... | E04D 1/26 428/143 |
| D344,144 S * | 2/1994 | Weaver | ........................ | D25/139 |
| 5,369,929 A * | 12/1994 | Weaver | ..................... | E04D 1/26 52/314 |
| 5,426,902 A * | 6/1995 | Stahl | ........................ | E04D 1/20 52/314 |
| 5,611,186 A * | 3/1997 | Weaver | ..................... | E04D 1/26 52/314 |
| 6,010,589 A * | 1/2000 | Stahl | ................... | B32B 38/1808 156/259 |
| 6,014,847 A * | 1/2000 | Phillips | ..................... | E04D 1/26 52/311.1 |

(Continued)

*Primary Examiner* — James M Ference

(57) ABSTRACT

A laminated composition shingle includes a first sheet having a first mineral granule surface and a first rectangular shape without tab cut-outs laminated with a second sheet having a second mineral granule surface. The second sheet has tab cut-outs along only one longer edge of the second sheet. The laminated composition shingle has a shingle width perpendicular to the long edges, The tab cut-outs have a tab width in the direction of the shingle width where two times the tab width is less than the shingle width minus two and one quarter inches (57 mm). Two times the tab width may be more than the shingle width minus four inches (102 mm). If the shingle width is at least 12" (305 mm), the tab cut-outs may have a tab width that is between 33% and 41.5% of the shingle width. All the tab cut-outs may have the same width.

20 Claims, 5 Drawing Sheets

(56) References Cited

U.S. PATENT DOCUMENTS

| | | | |
|---|---|---|---|
| 6,190,754 B1* | 2/2001 | Bondoc | E04D 1/26 156/260 |
| 6,220,329 B1* | 4/2001 | King | B32B 3/02 156/512 |
| 6,289,648 B1* | 9/2001 | Freshwater | D06N 5/00 52/314 |
| 6,305,138 B1* | 10/2001 | Stahl | E04D 1/20 52/314 |
| 6,361,851 B1* | 3/2002 | Sieling | B32B 3/02 428/141 |
| 6,457,290 B1* | 10/2002 | Elliott | E04D 1/26 427/188 |
| D466,629 S * | 12/2002 | Phillips | D25/139 |
| 6,708,456 B2* | 3/2004 | Kiik | A47G 27/0468 428/141 |
| 6,933,037 B2* | 8/2005 | McCumber | B32B 3/00 428/143 |
| 7,240,462 B2 | 7/2007 | Elliott et al. | |
| 8,430,983 B2* | 4/2013 | Vermilion | E04D 1/26 156/279 |
| 8,438,812 B2* | 5/2013 | King | E04D 1/26 52/314 |
| 8,623,164 B2* | 1/2014 | Belt | B32B 11/02 156/260 |
| 8,793,955 B2* | 8/2014 | Ray | E04D 1/26 428/126 |
| 9,140,012 B1* | 9/2015 | Leitch | E04D 1/26 |
| D750,810 S | 3/2016 | Buzza | |
| 9,464,439 B2* | 10/2016 | Buzza | E04D 1/12 |
| 9,739,062 B2* | 8/2017 | Leitch | E04D 1/26 |
| 2003/0040241 A1* | 2/2003 | Kiik | A47G 27/0468 442/242 |
| 2003/0163964 A1* | 9/2003 | Elliott | E04D 1/26 52/314 |
| 2004/0107664 A1* | 6/2004 | Rodrigues | E04D 1/20 52/557 |
| 2004/0123537 A1* | 7/2004 | Elliott | E04D 1/26 52/314 |
| 2004/0123543 A1* | 7/2004 | Elliott | E04D 1/26 52/518 |
| 2005/0193673 A1* | 9/2005 | Rodrigues | B32B 3/06 52/518 |
| 2007/0042158 A1* | 2/2007 | Belt | B32B 3/10 428/143 |
| 2007/0068108 A1* | 3/2007 | Kiik | E04D 1/26 52/518 |
| 2008/0005995 A1* | 1/2008 | Elliott | E04D 1/26 52/557 |
| 2011/0197534 A1* | 8/2011 | Belt | E04D 1/26 52/520 |
| 2011/0283646 A1* | 11/2011 | Vermilion | E04D 1/26 52/539 |
| 2012/0258282 A1* | 10/2012 | Hammond | C04B 26/26 428/143 |
| 2012/0260597 A1* | 10/2012 | Jenkins | E04D 1/26 52/518 |
| 2013/0025224 A1* | 1/2013 | Vermilion | E04D 1/26 52/309.2 |
| 2013/0025226 A1* | 1/2013 | Jenkins | E04D 1/26 52/557 |
| 2014/0245690 A1* | 9/2014 | Stahl | E04D 11/02 52/547 |
| 2015/0315789 A1* | 11/2015 | Buzza | E04D 1/20 52/526 |
| 2016/0177569 A1* | 6/2016 | Leitch | E04D 1/28 52/559 |
| 2017/0175393 A1* | 6/2017 | Leitch | E04D 1/26 |

* cited by examiner

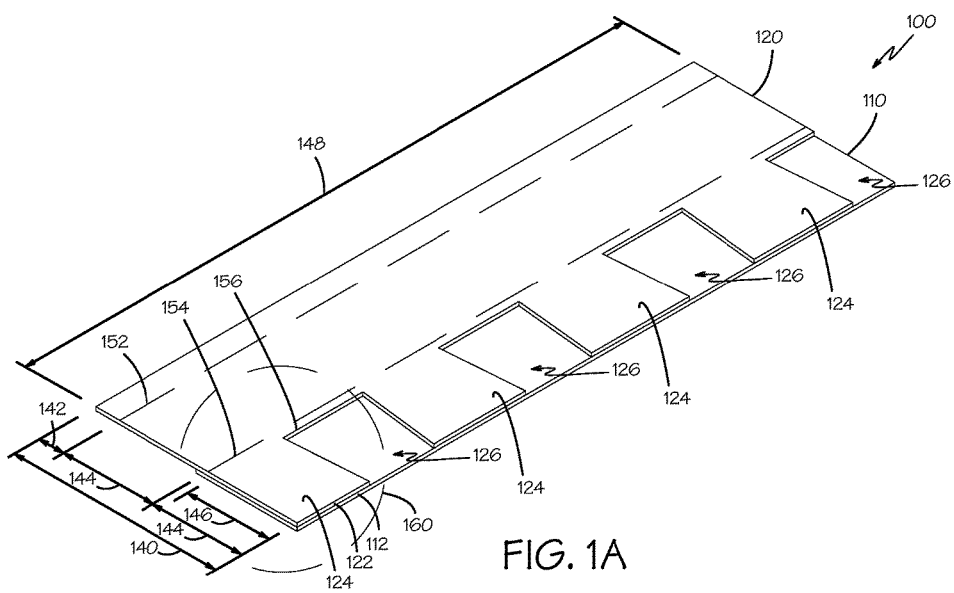
FIG. 1A
FIG. 1B
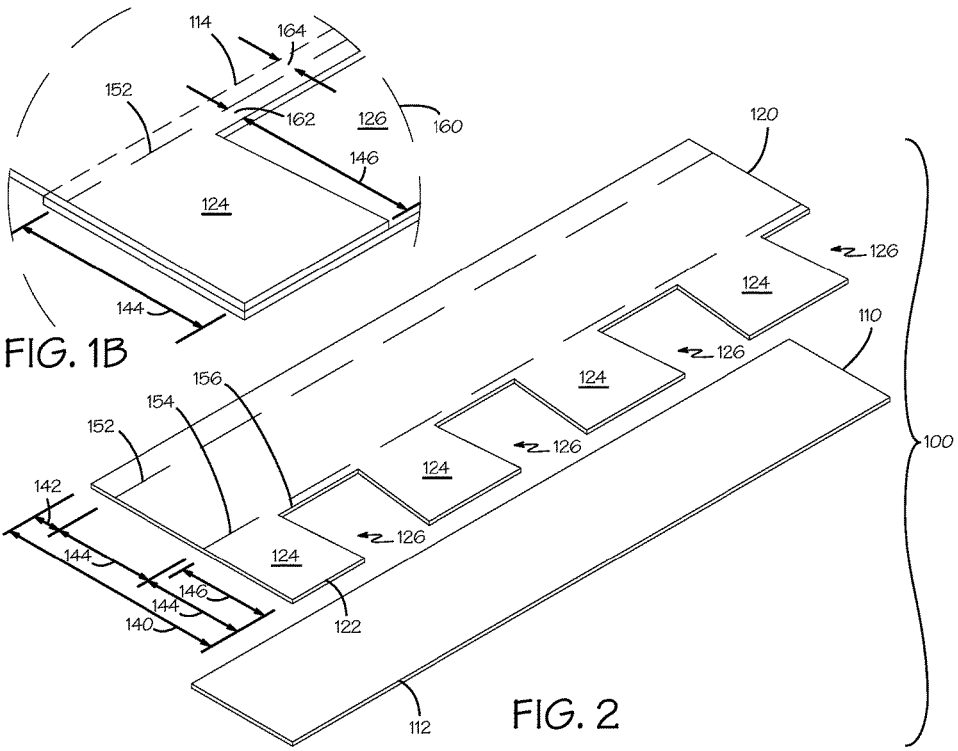
FIG. 2

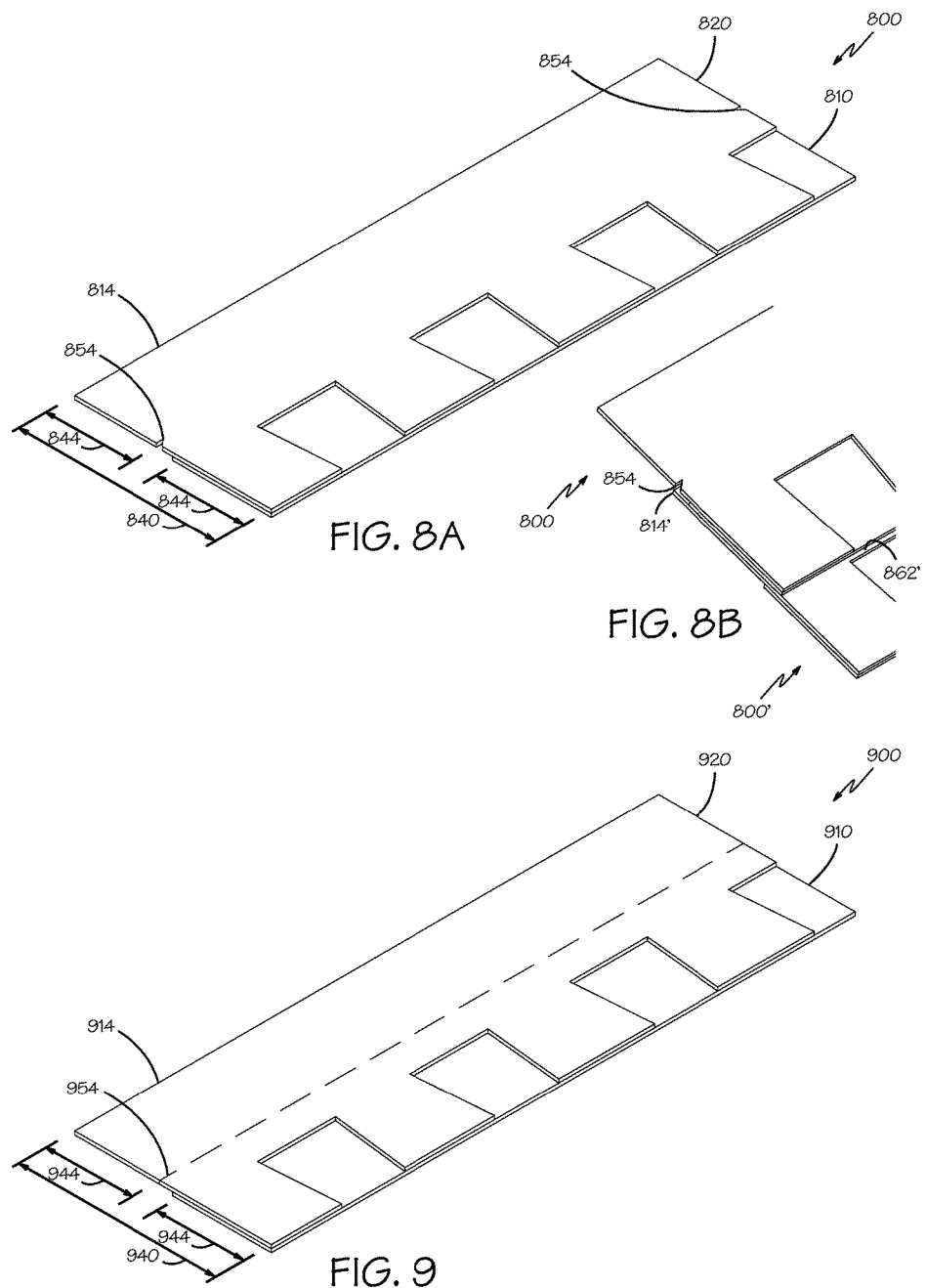

LAMINATED ROOF SHINGLE

BACKGROUND

Field

Embodiments of the invention relate to the field of roofing shingles; and more specifically, to laminated asphalt roofing shingles.

Background

Asphalt shingles are a commonly used roofing material. Such shingles may be manufactured as a laminated shingle to provide improved durability and appearance. A strip shingle in laminated form may include a base layer of composite roofing sheet material that is the full length dimension of the strip shingle and with no tab cut-outs. Laminated to this base layer is an overlay layer of similar composite roofing sheet material of the same length as the base. The overlay layer is adhesively laminated to the base layer, preferably with roofing asphalt.

The overlay layer may be of a different width than the base layer and have multiple, widely spaced cut-out tabs of rectangular or approximately rectangular shape, of the same or differing widths and the same or differing lengths. The pattern of tabs may be regular or randomized to avoid a discernable pattern when many shingles are laid as a roof covering. The pattern of tabs is sometimes referred to as a "dragon tooth" pattern. The surface areas of the base layer exposed in the spaces between the tabs of the overlay layer become tab-simulating areas of the laminated shingle when it is laid on the roof.

The composite roofing sheet material has an exposed surface that is coated with a mineral surface, e.g. crushed rock. The mineral surface provides a durable roofing surface that can be provided in a variety of colors, including variegated colors. The base layer and the overlay layer are generally made from sheet materials of different colors. This provides a contrast between the tabs of the overlay layer and the tab-simulating areas of the base layer that are exposed through the cut-outs of the overlay layer.

Even though laminated asphalt shingles offer significant cost, service life, and flammability advantages over wood shingles, wood shingles are still often preferred due to the pleasing aesthetic appearance of a wood shingled roof. An important aesthetic advantage of wood shingles is their greater thickness as compared to composite shingles. The thickness of wood shingles results in a more pleasing, layered look for the finished roof.

It would be desirable to provide a laminated asphalt shingle that allows colored granules to be applied to the composite roofing sheet material in a way that improves the aesthetic appearance of the laminated asphalt shingle.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements:

FIG. 1A is a pictorial view of an illustrative laminated composition shingle.

FIG. 1B is an enlarged detail view of the lower left corner of the laminated asphalt composition roofing shingle of FIG. 1A.

FIG. 2 is an exploded view of the laminated composition shingle shown in FIG. 1.

FIG. 8A is a pictorial view of yet another illustrative laminated composition shingle.

FIG. 8B is a view of a portion of the laminated composition shingle shown in FIG. 8A assembled to a preceding shingle.

FIG. 9 is a pictorial view of still another illustrative laminated composition shingle.

DETAILED DESCRIPTION

Figure 3:
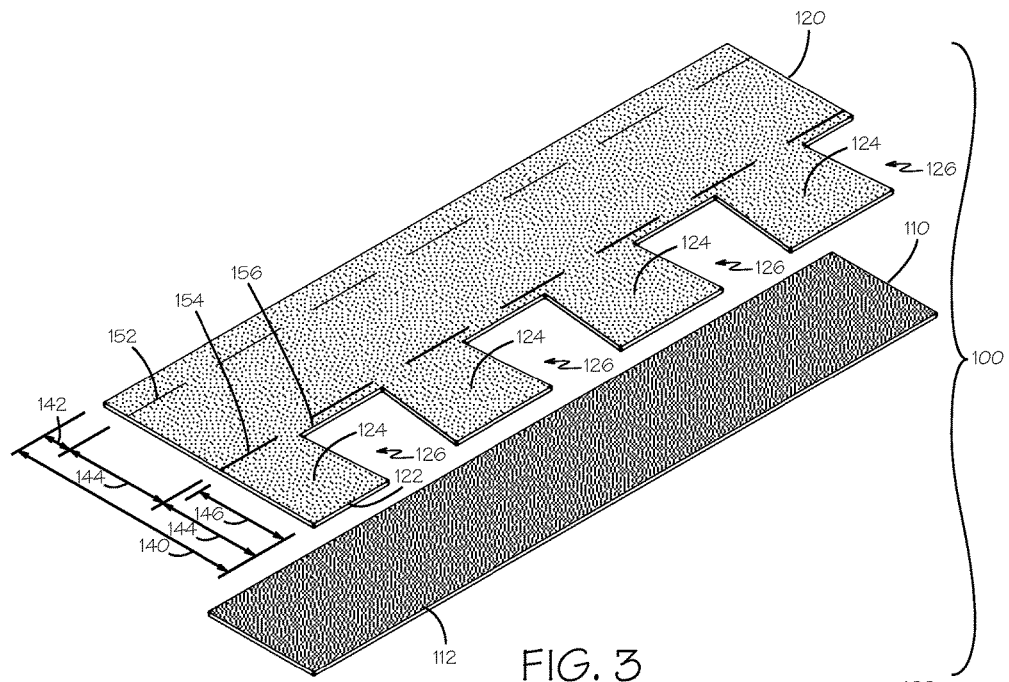
FIG. 3 is an exploded view of the laminated composition shingle shown in FIG. 1 with stippling to suggest a colored mineral granule surface.

In the following description, numerous specific details are set forth. However, it is understood that embodiments of the invention may be practiced without these specific details. In other instances, well-known circuits, structures and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, and operational changes may be made without departing from the spirit and scope of the present disclosure. The following detailed description is not to be taken in a limiting sense, and the scope of the embodiments of the present invention is defined only by the claims of the issued patent.

Dimensional information in the following description should be understood as nominal dimensions that are intended to encompass variations in dimensions that normally occur in the commercial production of laminated asphalt composition roofing shingles. Terms such as "approximately," "about," and "substantially" may be used to qualify dimensional information in the following description but such qualifications are intended merely to reinforce that the dimensions are nominal dimensions and not to differentiate qualified dimensions from unqualified dimensions. It will be recognized that roofing shingles are not precision parts and that substantial variations in dimensions can occur between nominally identical shingles without affecting their function or usability.

The terminology used herein is for the purpose of description only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

FIG. 1A is a pictorial view of an exemplary laminated asphalt composition roofing shingle 100. FIG. 1B is an enlarged detail view of the lower left corner 160 of the laminated asphalt composition roofing shingle 100 of FIG. 1A. FIG. 2 is an exploded view of the laminated asphalt composition roofing shingle 100 of FIG. 1A that shows the structure of the shingle.

The laminated composition shingle 100 shown in FIG. 1A includes a first sheet 110 having a first mineral granule surface and a first rectangular shape without tab cut-outs. A second sheet 120 having a second mineral granule surface and a plain surface opposite the second mineral granule surface is laminated to the first sheet 110 to form the shingle 100. The plain surface of the second sheet 120 is laminated to the first mineral granule surface of the first sheet 110. The second sheet 120 has a number of tabs 124 defined by tab cut-outs 126 along only one long edge of the second sheet.

The long edge 122 of the second sheet having the tab cut-outs is adjacent to one long edge 112 of the first sheet. In the shingle 100 shown in FIG. 1A, the long edge 122 of the second sheet 120 is aligned with the long edge 112 of the first sheet 110. The adjacent long edges are the edges that will be fully exposed when the shingle is installed as part of a complete shingle roof. The laminated composition shingle 100 has a shingle length 148 parallel to the long edges 112, 122 and a shingle width 140 perpendicular to the long edges.

In other shingles, the long edge of the second sheet may be slightly offset from the long edge of the first sheet for the purpose of creating certain decorative appearances. In still other shingles, the long edge of either or both of the sheets may not be a straight line.

The dimensions of most asphalt composition roofing shingles are standardized either to a shingle width 140 of 12" by a shingle length 148 of 36" or to a width of 0.337 m by a length of 1 m (13¼"×39⅜"). The shingle length is often about three times the shingle width because these dimensions allow packages of shingles to be effectively stacked on pallets. If the long edge of the shingle is not a straight line, the standardized dimensions will generally be for the largest rectangle that is fully covered by the shingle.

Laminated composition roofing shingles may have a portion that is a double thickness and a remaining portion that is a single thickness. The construction of most laminated composition roofing shingles is standardized such that the single thickness portion is slightly wider than the double thickness portion. Pairs of shingles can thus be stacked with a double thickness portion against a single thickness portion to produce a package of uniform thickness. Laminated composition roofing shingles described herein can be made according to these standards. While laminated composition roofing shingles made from two sheets of material are shown and described, it will be appreciated that additional sheets may be used to form a laminated shingle.

Figure 4:
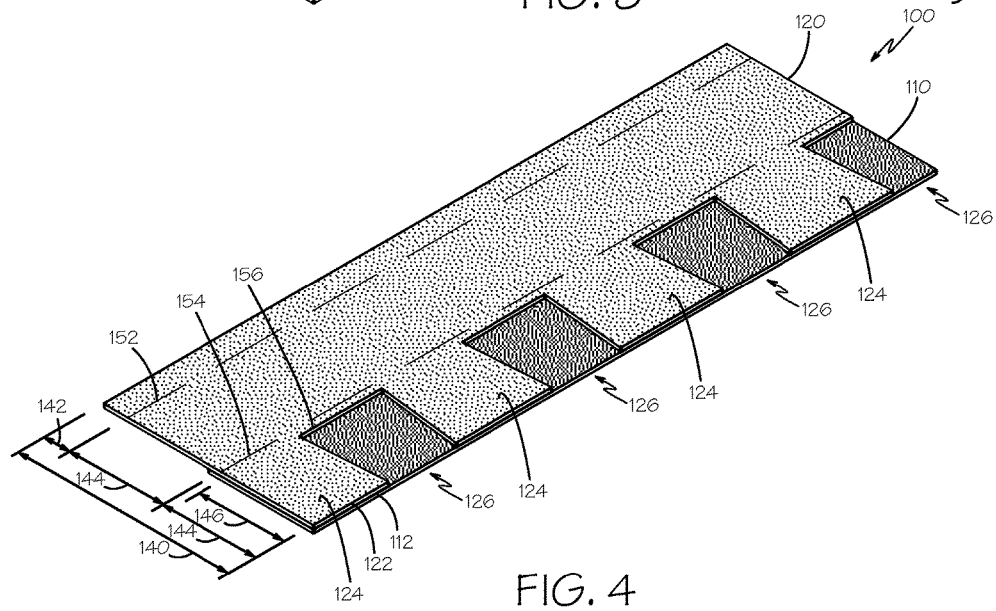
FIG. 4 is a pictorial view of the laminated composition shingle shown in FIG. 1 with stippling to suggest a colored mineral granule surface.

FIGS. 3 and 4 are an exploded view and a pictorial view respectively of the laminated asphalt composition roofing shingle 100 shown in FIG. 1. Stippling has been added to suggest colored mineral granule surfaces, such as crushed rock, that may provide a surface on the sheets 110, 120 that form the shingle 100. As suggested by the stippling, the first sheet 110 without tab cut-outs often has a darker mineral granule surface than the second sheet 120 having tabs 124. The mineral granule surfaces may be of variegated colors for the purpose of creating certain decorative appearances. As can be seen in FIG. 4, the contrasting colors of the mineral granule surfaces can reinforce the appearance of the tabs 124 and increase the appearance of thickness variations of the shingle 100.

Figure 5:
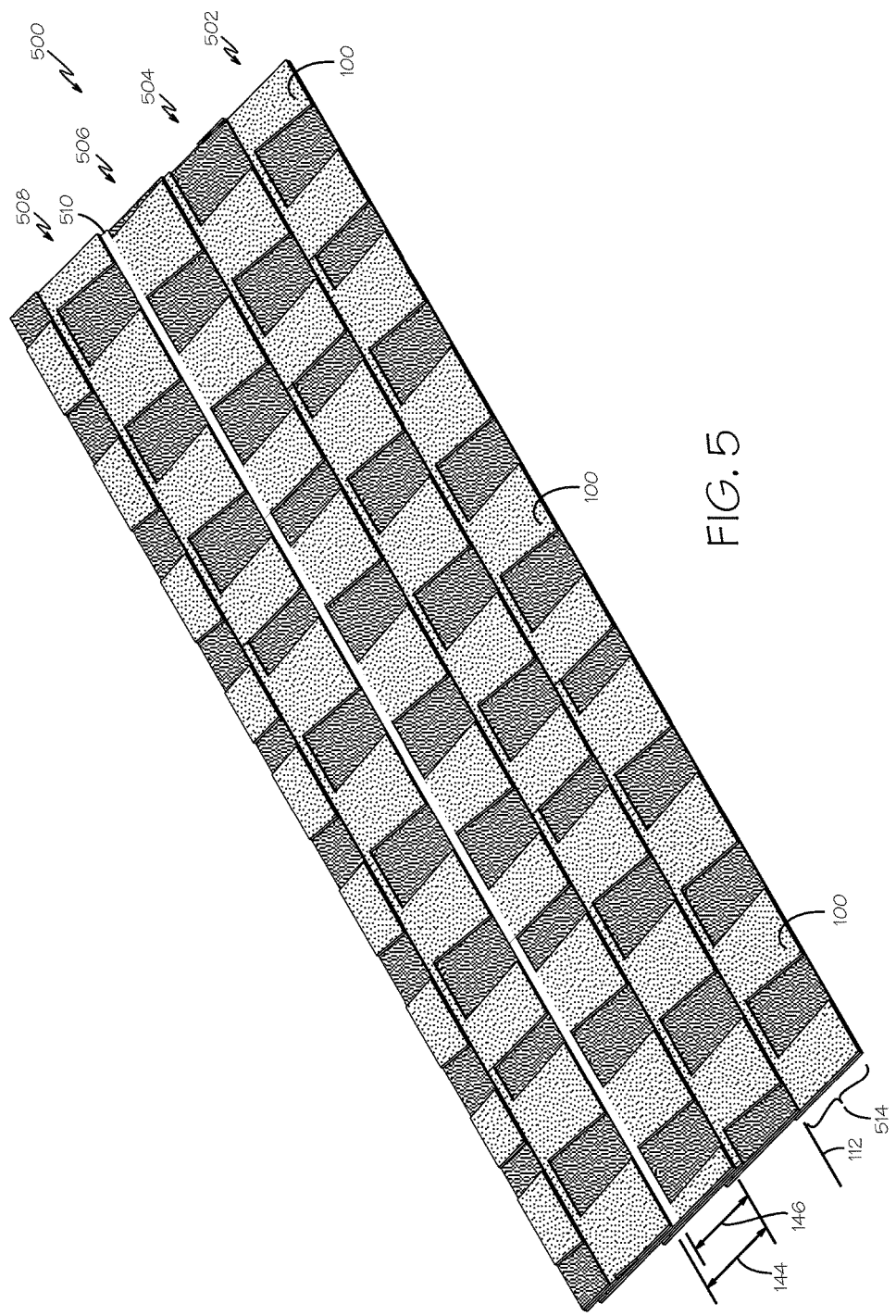
FIG. 5 is a pictorial view of a portion of a roof to which laminated composition shingles of the type shown in FIGS. 1 and 3 have been applied.

FIG. 5 is a pictorial view of a portion of a roof 500 covered with laminated asphalt composition roofing shingles 100 of the type shown in FIGS. 1 and 4. Laminated composition shingles 100 are applied to a roof by laying rows or courses 502, 504, 506, 508 of shingles laid end to end with the lower edge 112 of the shingles parallel to a lower edge or eave of the roof. Successive courses of shingles are laid with a portion 514 of the preceding course 502 of shingles left exposed below the lower edge 112 of the succeeding course 504. Generally, somewhat less than half of each shingle is left exposed to provide a water-tight roof by providing a headlap, as explained below.

A portion of the shingles 100 in one course 502 immediately above the exposed portion 514 will be covered by the succeeding course 504. A portion of these shingles 100 adjacent the long edge furthest from the exposed long edge will be further covered by the next succeeding course 506. Thus, there will be three shingles layered together along the upper long edge of a shingle. This portion of the shingle is called the headlap.

Asphalt shingles used for roof coverings often have to comply with building codes that are based on the model International Building Code (IBC) developed by the International Code Council (ICC). The IBC requires asphalt shingles to comply with one of the standards for such shingles developed by the American Society for Testing Materials (ASTM), such as ASTM D3462. The ASTM standards state, "Shingles meeting this specification are intended to be applied with a headlap of not less than 51 mm (2 in.)." Thus it is necessary to provide at least a 2" (51 mm) headlap allowance to provide an asphalt shingle that complies with ASTM standards. For this reason, providing a 2" headlap on a shingle is not a mere design choice for a commercially acceptable shingle.

The shingle width 140 minus the headlap width 142 is two times the width of the exposure 144. In other words, the exposure is 50% of the shingle width 140 minus the headlap width 142. Laying a 12"×36" laminated composition shingles with a 2" headlap provides a 5" exposure, 0.5× (12"−2"). Laying a 0.337 m×1 m (13¼"×39⅜") laminated composition shingle with a 51 mm (2") headlap provides a 143 mm (5⅝") exposure, 0.5×(337 mm−51 mm).

The exposed portion of the laminated composition shingle generally has a width that is between 40% and 45% of the overall shingle width of the laminated composition shingle. The exposed portion will be a greater portion of the overall width as the shingle width increases since the headlap allowance remains constant. Thus the 5" exposed portion of 12"×36" laminated composition shingles is 41.7% of the shingle width. The 143 mm exposed portion of 0.337 m×1 m (13¼"×39⅜") laminated composition shingles is 42.4% of the shingle width.

The cut-out tabs 126 in the overlay layer 120 of a laminated composition shingle 100 have a tab width 146 in the direction of the shingle width 140 that is less than the exposure width 144 of the shingle. This differs from conventional laminated asphalt shingles in which the width of the cut-out tabs is the same as the exposure width. Reducing the tab width 146 of the cut-out tabs 126 results in an uninterrupted area 510 on the overlay layer 120 above the cut-out tabs 126. The uninterrupted area 510 of the third course 506 has been highlighted in FIG. 5 by removing the stippling in the uninterrupted area. The uninterrupted area 510 is a continuous rectangular area with a length equal to the length 148 of the shingle 100.

FIG. 1B shows an enlarged detail 160 of the laminated composition shingle 100 shown in FIG. 1A. The width 162 of the uninterrupted area is the exposure width 144 minus the tab width 146 of the cut-out tabs 126. The uninterrupted area will be immediately adjacent to the lower edge 122 of a succeeding course. The uninterrupted area on the overlay layer 120 provides a step-off area that can be colored in contrast to the tabs 124 of the overlay layer and the tab-simulating areas of the base layer visible through the tab cut-outs 126 immediately below the uninterrupted area.

It has been found that creating a thin, dark step-off area immediately adjacent to the lower edge 122 of a succeeding course has the surprising effect of making the laminated composition shingles look thicker when applied as a roof covering. To create this illusion the step-off area should be relatively thin and well defined. The step-off width 162 should be at least ⅛" (3 mm) since it is difficult to reliably manufacture shingles to provide a step-off area with a smaller nominal width. A step-off width 162 of ¼" (6 mm) is preferred. The step-off width 162 should be less than 0.1" (26 mm), and preferably less than ½" (13 mm), because the illusion of thickness becomes less convincing if the step-off width is too great.

If two times the tab width 146 is less than the shingle width 140 minus two and one quarter inches (57 mm), there will be a step-off having a width 162 of at least ⅛" (3 mm). If two times the tab width 146 further is less than the shingle width 140 minus two and one half inches (63 mm), there will be a step-off having a width 162 of at least ¼" (6 mm). If two times the tab width 146 is more than the shingle width 140 minus four inches (102 mm), the step-off will have a width 162 of no more than 1" (26 mm). If two times the tab width 146 is more than the shingle width 140 minus three inches (76 mm), the step-off will have a width 162 of no more than ½" (13 mm).

As previously explained, the exposure width 144 is 50% of the shingle width 140 minus the headlap width 142. The tab cut-outs 126 have a tab width 146 of less than 98% of the exposure width. More preferably, the tab cut-outs 126 have a tab width 146 of less than 96% of the exposure width. Preferably, the tab cut-outs 126 have a tab width 146 that is also more than 80% of the exposure width. More preferably, the tab cut-outs 126 have a tab width 146 that is also more than 90% of the exposure width.

For laminated composition shingles having a shingle width 140 of at least 12" (305 mm), the tab width 146 can be established according to the shingle width. For such shingles, the tab cut-outs have a tab width of less than 41.5% of the shingle width. More preferably, the tab width is less than 40.7% of the shingle width. Preferably, the tab width is also more than 33% of the shingle width. More preferably, the tab width is also more than 37% of the shingle width.

The lower, visible edge of the step-off area should be relatively straight and sharply defined to create the illusion of a thick edge on the succeeding course of shingles. The thick edge illusion is distinctly different from a shadow illusion because a shadow illusion is created by a wider area that is less sharply defined. Providing a step-off area that lies entirely on the second sheet 120 allows the lower, visible edge of the step-off area to be more sharply defined than it would be if the line included areas on the first sheet 110.

It will be noted that the width of the first sheet 110 is slightly less than one-half of the shingle width 140. Therefore, the long edge 114 of the first sheet 110 that is near the middle of the width of the second sheet 120 is slightly less than one-half of the headlap width beyond the exposure width 144. This creates a nailing strip having a width 164 of slightly less than one-half of the headlap width. Nails driven through the nailing strip will secure both layers of the shingle and the headlap of the preceding course. The exposed portion of the succeeding course will cover the nails. In the figures, the step-off width 162 has been exaggerated to show the step-off more clearly. While the nailing strip width 164 is shown as being about the same as the step-off width 162, the step-off width will generally be much less than the nailing strip width.

Pairs of overlay layers 120 are cut as interlocking tab strips from a single sheet of shingle roofing material. The cut-out tabs 126 of a first overlay layer are rotated 180° to become the tabs of a second overlay layer. Therefore the tabs 124 of the overlay layer 120 and the tab-simulating areas 126 of the base layer 110 cannot provide the ability to color a laminated shingle 100 in the same way as the uninterrupted area 510 on the overlay layer. The coloring that falls on a conventional overlay layer immediately adjacent to the lower edge of a succeeding course will also fall on the lower exposed edge of the overlay layer because of use of the cut-out tabs of one overlay layer to become the tabs of another overlay layer with a 180° rotation.

The width 146 of the cut-out tabs 126 in the overlay layer 120 of a laminated composition shingle 100 that embodies may be between 90% and 97% of the width 144 of the exposed portion 514 of the laminated composition shingle. Thus the width 146 of the cut-out tabs 126 in an inventive 12"×36" laminated composition shingle with a typical 5" exposure is between 4.50" (0.90×5") and 4.85" (0.97×5"). This will provide an uninterrupted area 510 on the overlay layer 120 between 0.15" and 0.50" wide. The width 146 of the cut-out tabs 126 in an inventive 0.337 m×1 m (13¼"×39⅜") laminated composition shingle with a typical 0.143 m (5⅝") exposure is between 0.129 m (5.06") and 0.139 m (5.46"). This will provide an uninterrupted area 510 on the overlay layer 120 between 4 mm (0.16") and 14 mm (0.57") wide.

A laminated composition shingle 100 (FIG. 1) may include visible marking 154 on the second mineral granule surface of the second sheet 120 to indicate where a succeeding course of shingles should be placed to provide the correct exposure 514 and headlap 152. The visible marking 154 may indicate a line where the lower edge 112 of a succeeding course of shingles should be placed to provide the correct exposure 514 and headlap 152. The visible marking 154 may indicate where a succeeding course of shingles should be placed based on other visible references on the shingles, such as the upper edge of the shingle. The visible marking 154 may be first and second markings on each shingle, such that a first mark on the succeeding course of shingles is aligned with a second mark on the preceding course of shingles. Visible marking 154 may be desirable on a laminated composition shingle 100 because the upper edge 156 of the tab cut-outs does not provide an indication of where the lower edge 112 of a succeeding course of shingles should be placed as it does on conventional laminated composition shingles.

The visible marking 154 may be a painted or inked line applied to the second mineral granule surface, a color change in the second mineral granule surface, a gap in the second mineral granule surface, notches on the short edges of the shingle, a slit in the second sheet, or other markings that will be visible during the installation of the shingles. The visible marking may extend across the entire length of the shingle, be applied at only two separated points on the shingle, or be intermittent along the length of the shingle.

Of course, it will be understood that a laminated composition shingle 100 may lack visible markings. Unmarked shingles can be applied with the proper exposure by methods that measure the amount of exposure being provided as the shingles are applied.

Figure 6:
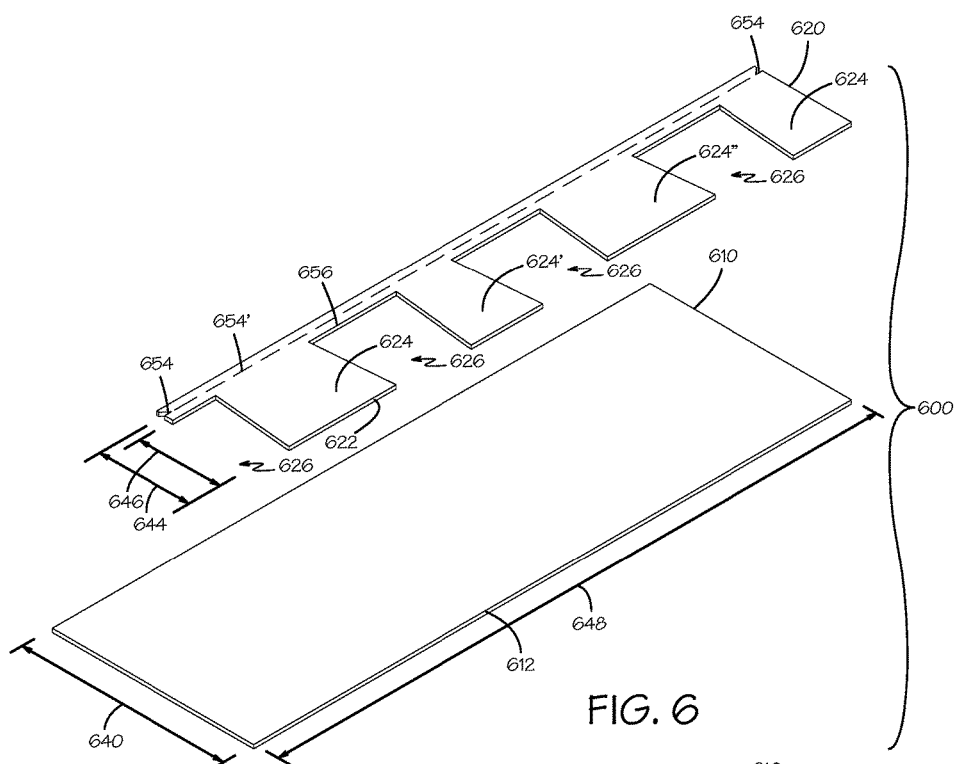
FIG. 6 is an exploded view of another illustrative laminated composition shingle.
Figure 7:
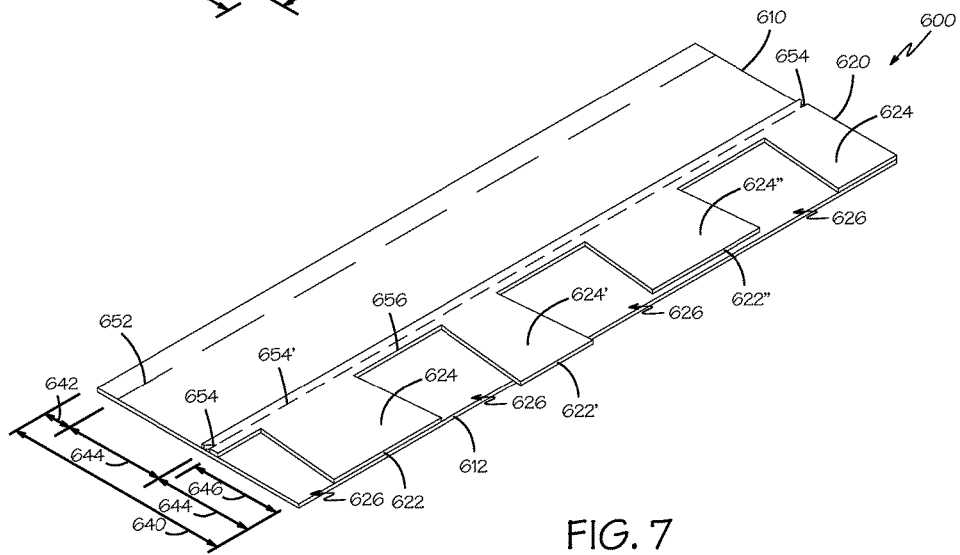
FIG. 7 is a pictorial view of the assembled laminated composition shingle shown in FIG. 6.

FIG. 6 is an exploded view of another exemplary laminated asphalt composition roofing shingle 600. FIG. 7 is a pictorial view of the assembled laminated asphalt composition roofing shingle 600 shown in FIG. 6.

The laminated asphalt composition roofing shingle 600 shown in FIGS. 6 and 7 has a first sheet 610 without tab cut-outs that is the full shingle length 648 and full shingle width 640 of the assembled laminated asphalt composition roofing shingle. The second sheet 620, having tab cut-outs 626, is slightly less than one-half the width of the full shingle width 640 of the assembled laminated asphalt composition roofing shingle.

The plain surface of the second sheet 620 is laminated to the first mineral granule surface of the first sheet 610. The longer edge 622 of the second sheet 620 having the tab cut-outs 626 is adjacent to one of the longer edges 612 of the first sheet 610.

As can be seen in FIG. 7, some tabs 624' may be lengthened such that the lower edge 622' of the tab extends beyond the lower edge 612 of the first sheet 610. Other tabs 624" may be shortened such that the lower edge 622" of the tab does not extend to the lower edge 612 of the first sheet 610. Shingles may include only lengthened tabs, only shortened tabs, or both, in various arrangements in addition to the one exemplary arrangement illustrated. As used herein, the width of the tab cut-out 646 is the distance from the longer edge of the shingle providing uninterrupted coverage, the lower edge 612 of the first sheet 610 for the illustrated shingle, to the edge 656 of the tab cut-out adjacent the uninterrupted area of the second sheet 620.

It may desirable that all the edges 622 of the tab cut-outs adjacent the uninterrupted area lie on a straight line. This may require that the lower ends 622, 622' of tabs 624, 624' that are shorter than the longest tab 624" be cut to interlock with another second sheet with a scrap area between the shortened lower ends and the edges adjacent the uninterrupted area.

The laminated asphalt composition roofing shingle 600 shown in FIGS. 6 and 7 has visible marking 654 to indicate where the lower edge 612 of a succeeding course of shingles should be placed to provide the correct exposure and headlap. The visible marking shown in FIGS. 6 and 7 is in the form of notches 654 at the two opposite edges of the second sheet 620. The dashed line 654' shows the lay line that is indicated by the two notches 618, but does not represent a marking applied to the second sheet. As discussed above, the shingle may have other forms and placement of marking or may not have any visible marking.

It will be noted that the width of the second sheet 620 is slightly less than one-half of the shingle width 640. Therefore, the long edge of the second sheet 620 that is near the middle of the width of the first sheet 610 is slightly less than one-half of the headlap width beyond the exposure width 644. This creates a nailing strip having a width of slightly less than one-half of the headlap width. Nails driven through the nailing strip will secure both layers of the shingle and the headlap of the preceding course. The exposed portion of the succeeding course will cover the nails.

FIG. 8A is a pictorial view of yet another exemplary laminated asphalt composition roofing shingle 800. FIG. 8B is a view of a portion of the laminated composition shingle 800 shown in FIG. 8A assembled to a preceding shingle 800'. The laminated asphalt composition roofing shingle 800 shown in FIG. 8 has a first sheet 810 without tab cut-outs that is laminated with a second sheet 820, having tab cut-outs, that is the full shingle width 840. The shingle 800 has visible marking 854 to indicate where the shingle should be aligned with an upper edge 814' of a preceding course to provide the correct exposure 844 and headlap.

The visible marking may be in the form of notches 854 at the two opposite edges of the second sheet 820. The notches 854 are the exposure width 854 from the upper edge of the shingle 800. As seen in FIG. 8B, the notch 854 is aligned with the top long edge 814' of a shingle 800' in the preceding course. This leaves a visible step-off 862' above the tab cut-outs of the shingles 800' in the preceding course because the exposure 844 is larger than the tab width of the tab cut-outs.

A shingle similar to the shingle 600 shown in FIGS. 6 and 7 could have a visible marking similar to the visible marking 854 shown in FIG. 8 where there are notches at the two opposite edges of the first sheet.

FIG. 9 is a pictorial view of still another exemplary laminated asphalt composition roofing shingle 900. The laminated asphalt composition roofing shingle 900 shown in FIG. 9 has a first sheet 910 without tab cut-outs that is laminated with a second sheet 920, having tab cut-outs, that is the full shingle width 940. The shingle 900 has visible marking 954 to indicate where the shingle should be aligned with an upper edge of a preceding course to provide the correct exposure 944 and headlap. The visible marking may be slits in the second sheet, or other markings that will be visible during the installation of the shingles. The visible marking may extend across the entire length of the shingle, be applied at only two separated points on the shingle, or be intermittent along the length of the shingle.

A shingle similar to the shingle 600 shown in FIGS. 6 and 7 could have a visible marking similar to the visible marking 954 shown in FIG. 9 where the marking is applied to the first sheet.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A laminated composition shingle comprising:
   a first sheet having a first mineral granule surface and a first rectangular shape without tab cut-outs; and
   a second sheet having a second mineral granule surface, a third surface opposite the second mineral granule surface, and a second rectangular shape with tab cut-outs along only one long edge of the second sheet, the third surface of the second sheet laminated to the first mineral granule surface of the first sheet with the long edge of the second sheet having the tab cut-outs adjacent to one long edge of the first sheet to form the laminated composition shingle having a shingle width perpendicular to the long edges, a first width that is the shingle width less 2 inches (51 mm), and an exposure width that is one-half of the first width, the tab cut-outs having a tab width in a direction of the shingle width less than the exposure width minus ⅛ of an inch (3 mm).

2. The laminated composition shingle of claim 1, where the tab width further is less than the exposure width minus ¼ of an inch (6 mm).

3. The laminated composition shingle of claim 1, where the tab width is more than the exposure width minus 1 inch (25 mm).

4. The laminated composition shingle of claim 1, where the tab width is more than the exposure width minus ½ of an inch (13 mm).

5. The laminated composition shingle of claim 1, where a width of each of the tab cut-outs is the same.

6. The laminated composition shingle of claim 1, where the first sheet has a length that is the same as a length of the laminated composition shingle and a width that is less than one-half the shingle width.

7. The laminated composition shingle of claim 6, where the second sheet has a length that is the same as the length of the laminated composition shingle and a width that the same as the shingle width.

8. A laminated composition shingle comprising:
   a first sheet having a first mineral granule surface and a first rectangular shape without tab cut-outs; and
   a second sheet having a second mineral granule surface, a third surface opposite the second mineral granule surface, and a second rectangular shape with tab cut-outs along only one long edge of the second sheet, the third surface of the second sheet laminated to the first mineral granule surface of the first sheet with the long edge of the second sheet having the tab cut-outs adjacent to one long edge of the first sheet to form the laminated composition shingle having a shingle width perpendicular to the long edges, a first width that is the shingle width less a headlap width, and an exposure width that is 50% of the first width, the tab cut-outs having a tab width of less than 98% of the exposure width.

9. The laminated composition shingle of claim 8, where the tab width further is less than 96% of the exposure width.

10. The laminated composition shingle of claim 8, where the tab width is more than 80% of the exposure width.

11. The laminated composition shingle of claim 8, where the tab width is more than 90% of the exposure width.

12. The laminated composition shingle of claim 8, where the headlap width is 2" (51 mm).

13. The laminated composition shingle of claim 8, where the first sheet has a length that is the same as a length of the laminated composition shingle and a width that is less than one-half the shingle width.

14. The laminated composition shingle of claim 13, where the second sheet has a length that is the same as the length of the laminated composition shingle and a width that the same as the shingle width.

15. A laminated composition shingle comprising:
    a first sheet having a first mineral granule surface and a first rectangular shape without tab cut-outs; and
    a second sheet having a second mineral granule surface, a third surface opposite the second mineral granule surface, and a second rectangular shape with tab cut-outs along only one long edge of the second sheet, the third surface of the second sheet laminated to the first mineral granule surface of the first sheet with the long edge of the second sheet having the tab cut-outs adjacent to one long edge of the first sheet to form the laminated composition shingle having a shingle width perpendicular to the long edges, the shingle width being at least 12" (305 mm), the tab cut-outs having a tab width of less than 41.5% of the shingle width.

16. The laminated composition shingle of claim 15, where the tab width further is less than 40.7% of the shingle width.

17. The laminated composition shingle of claim 15, where the tab width is more than 33% of the shingle width.

18. The laminated composition shingle of claim 15, where the tab width is more than 37% of the shingle width.

19. The laminated composition shingle of claim 15, where the first sheet has a length that is the same as a length of the laminated composition shingle and a width that is less than one-half the shingle width.

20. The laminated composition shingle of claim 19, where the second sheet has a length that is the same as the length of the laminated composition shingle and a width that the same as the shingle width.

* * * * *